A. W. GATES.
DIE FOR MAKING ARTICLES OF PLASTIC MATERIAL.
APPLICATION FILED JUNE 13, 1919.
1,393,014.
Patented Oct. 11, 1921.
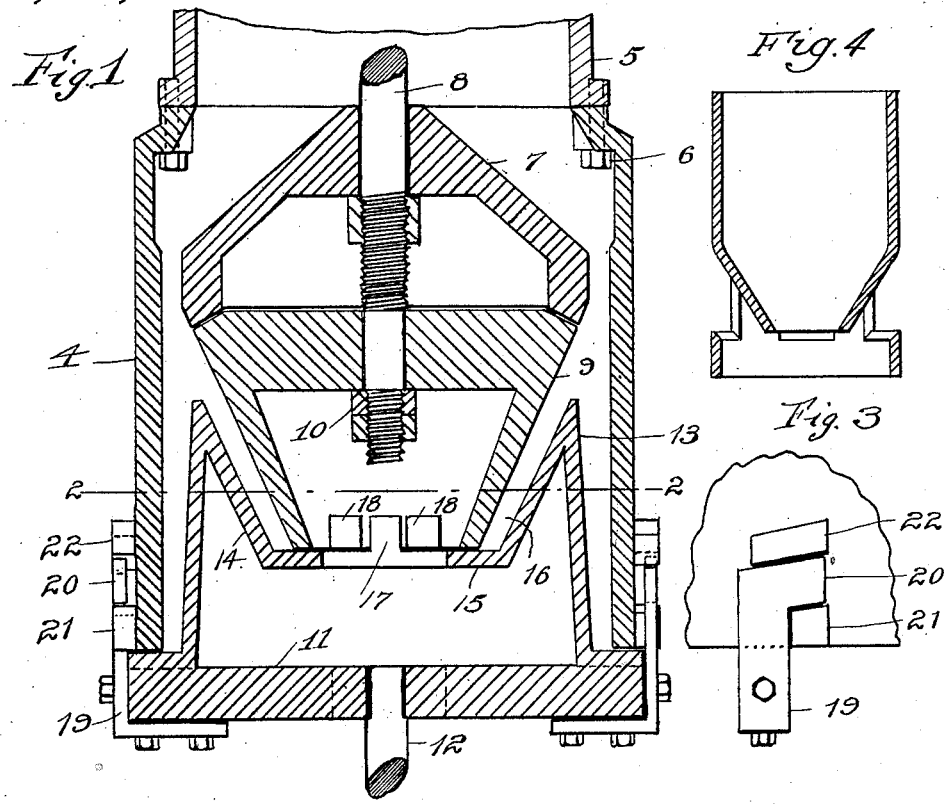
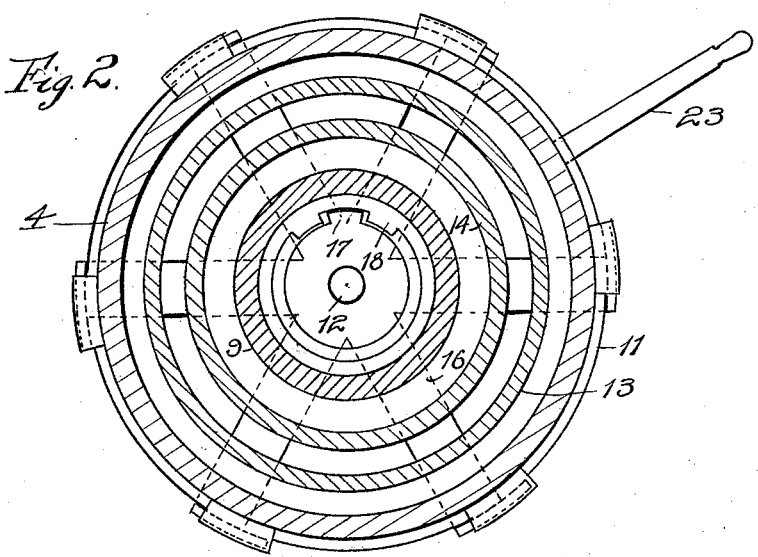
INVENTOR.
BY *Andrew W. Gates,*
*Glenn S. Noble*
ATTORNEY

UNITED STATES PATENT OFFICE.

ANDREW W. GATES, OF MONMOUTH, ILLINOIS.

DIE FOR MAKING ARTICLES OF PLASTIC MATERIAL.

1,393,014. Specification of Letters Patent. Patented Oct. 11, 1921.

Application filed June 13, 1919. Serial No. 303,821.

*To all whom it may concern:*

Be it known that I, ANDREW W. GATES, a citizen of the United States, residing at Monmouth, in the county of Warren and State of Illinois, have invented certain new and useful Improvements in Dies for Making Articles of Plastic Material, of which the following is a specification.

While various articles of substantially cylindrical form are made in clay presses, it has not been considered practicable to make reducers, or conical shaped devices, or combined cylindrical and conical or tapered articles in such presses. One of the principal difficulties has been the liability of injuring the articles on account of the suction between the die member and the clay. The present invention relates to a device or die for making special articles of clay and particularly articles having reduced or conical portions. It is especially adapted for making feeders for animals, such feeders having cylindrical walls and inner, integrally formed conical hoppers.

The objects of this invention are to provide a new and improved die or apparatus for making articles from clay; to provide a die having means for breaking the suction between the die members and the clay; to provide a die having means for rotating and simultaneously drawing one of the members thereof; to provide a device of this character adapted for making conical or tapered articles; and in general, to provide such an improved mechanism for use in clay presses as will be described more fully hereinafter.

In the accompanying drawings illustrating this invention:

Fig. 1 is a vertical sectional view;

Fig. 2 is a cross-sectional view; and

Fig. 3 is a detail of one of the locking and die drawing members.

Fig. 4 is a vertical section of the finished product, the scale being smaller than Fig. 1.

As shown in these drawings, the shell or main outer die member 4 is secured to the clay press cylinder 5 in any convenient manner as by means of bolts 6. This shell or cylinder constitutes the outer forming member and coacts with the inner cores or forming members. The inner core comprises an upper bell-shaped section 7 which is secured to the usual center shaft 8 of the press, this center shaft being ordinarily supported by means of a spider in the cylinder 5. The shaft 8 also supports a lower conical or tapered core section 9 which is rotatably mounted thereon and held in any convenient manner as by means of nuts 10. A former or die member 11 is mounted in the lower portion of the cylinder 4 and is carried by the usual former shaft 12 of the press. The outer wall 13 of the former, which is concentric with the die 4, is made slightly tapered or conical for purposes which will presently be described. This former also has an inner wall 14 of tapered or conical shape which co-acts with the correspondingly tapered surface of the core section 9. The lower end of the frustum 14 has a horizontal ring or disk 15 which closes the lower end of the opening 16 between the core 9 and wall 14. The ring 15 has an upwardly projecting lug 17 which fits somewhat loosely between two co-acting lugs 18 on the core section 9.

The former or die member 11 is provided with a plurality of locking arms or catches 19 having their upper ends or locking portions arranged at a slight angle to the base. These locking portions co-act with lugs 21 and 22 on the die 4, the locking surfaces of these lugs being arranged at angles corresponding to the locking portions of the arms 19. The former 11 is also provided with a handle 23 for rotating the same.

When the parts are all arranged as shown in Fig. 1, the clay is pressed down over the core 7 through the opening between it and the die 4 until all of the space between the former 11 and the co-acting die parts is filled. It will be seen that this provides an article having a substantially cylindrical outer wall with an inwardly projecting cone or hopper. The former 11 is then turned by means of the handle 23. This rotary movement tends to break the seal or suction between the former and the clay or plastic material in the die. As the former is turned, the upper surfaces of the locking members 20 co-act with the lugs 22 to force the former downwardly with a screw-like movement. By means of this combined rotary and screw movement, it is possible to remove or loosen large die members which could not otherwise be operated and this combined movement forms one of the particularly novel features of this invention. As the former 11 is rotated, the lugs 17 co-act with the lugs 18 to rotate the rotatable core section 9 which breaks the suction or seal between this member and the adjacent clay. The former 11 is then lowered out of position and more clay is forced down into the die. As this clay is forced in, it pushes the already formed material downwardly out of the die 4 and forms a cylindrical continuation which may be made of any length desired. When this cylindrical portion has been completed, a wire or cutter is passed under the lower edge of the die 4 and cuts off the clay, the completed article then being removed for drying. It will be seen that this leaves the die 4 with a downwardly extending cylindrical section of clay around the inner wall thereof. The former 11 is then raised to its locking position and the tapered end of the wall 13 permits its being readily inserted inside of the clay which remains in the die 4. The former is again locked and the die is ready for the next operation.

From this description it will be seen that I provide a die which is adapted for forming combined tubular and conical shaped articles, or articles having reduced portions or specially shaped ends. For these reasons the die may be made in various forms for producing different articles and therefore, I do not wish to be limited to the particular arrangement herein shown and described, except as specified in the following claims in which I claim:

1. A mold for forming earthenware articles, comprising outer and inner die members shaped to form articles having cylindrical and conical portions, and means for rotating one of said members and forcing it longitudinally with respect to the other member.

2. A die for clay presses, comprising co-acting members adapted to form articles having cylindrical portions and reduced portions, and means for rotating one of said members.

3. In a device of the character set forth, the combination of a cylindrical die, a core arranged centrally in said die, a conically shaped core rotatably mounted beneath the first-named core, a former projecting upwardly between the last-named core and the die, a lost-motion connection between the former and the rotatable core, means for rotating the former, and means for locking the former to the die, said means having inclined surfaces whereby the former will be moved longitudinally with respect to the die.

4. In a device of the character set forth, the combination of a die 4, a conically shaped core 7 mounted centrally in said die, a conical core 9 rotatably mounted below the first-named core, a bottom die member 11 having connected conical walls 13 and 14 projecting upwardly between the core 9 and the die 4, arms secured to the bottom die member, lugs on the die 4, adapted to engage with said arms, the lugs and arms having their engaging portions arranged at an angle to the bottom of the die whereby the bottom die member will be forced either upwardly or downwardly when it is rotated, means for rotating said bottom die member, and a connection between the bottom die member and the core 9.

5. In a device of the character set forth, the combination with a fixed die member, of an inner removable rotatable die member adapted to co-act therewith, to form the lower portion of the articles to be molded, and an inner fixed die member adapted to co-act with the outer member to form a cylindrical continuation of the article to be molded, after the removable member has been withdrawn.

6. The combination of a cylindrical die member adapted to be secured to the cylinder of clay press, a co-acting fixed core mounted centrally in said cylinder, a conical core rotatably mounted beneath said fixed core, a former for closing the lower end of the cylinder, said former having an upwardly extending wall spaced apart from the cylinder and having a connected downwardly extending wall spaced apart from the rotatable core, and having a horizontal wall for closing the bottom of the last-named space, a lug on said former, lugs on the rotatable core co-acting with said last-named lug, means for rotating the former, arms secured to said former and having engaging portions at their upper ends, and lugs on the cylinder co-acting with the engaging portions of the arms to form screw-like connections between the former and the cylinder.

7. A die for making articles of earthenware, comprising means for forming an article having a main cylindrical portion, and having a reduced end, whereby said end is first formed and then the main portion is formed substantially as described.

ANDREW W. GATES.